(No Model.)
R. JENSEN.
SEED GERMINATING APPARATUS.
No. 262,786. Patented Aug. 15, 1882.
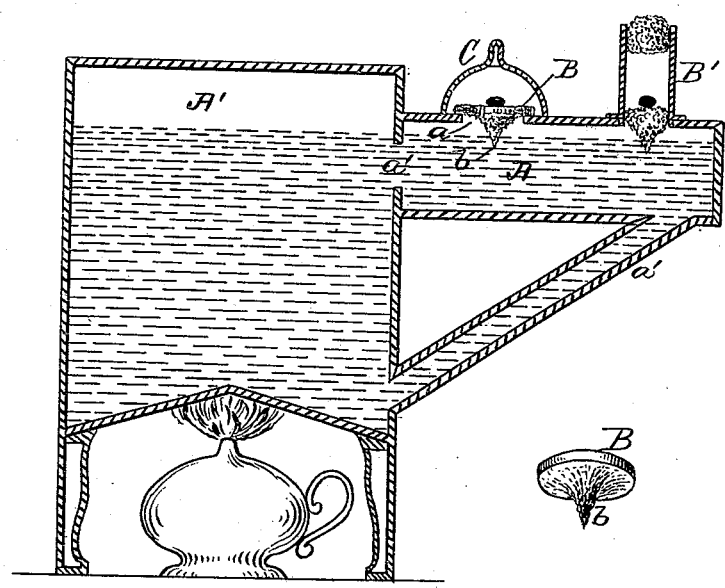
WITNESSES:
A. S. Filch
Henry Erichling
INVENTOR
Rasmus Jensen
BY S. S. Filch.
ATTORNEY

United States Patent Office.

RASMUS JENSEN, OF ROSVANG, NEAR THISTED, DENMARK, ASSIGNOR, BY MESNE ASSIGNMENTS, TO THORBURN & TITUS, OF NEW YORK, N. Y.

SEED-GERMINATING APPARATUS.

SPECIFICATION forming part of Letters Patent No. 262,786, dated August 15, 1882.

Application filed March 29, 1882. (No model.) Patented in Sweden July 29, 1880; in Denmark September 24, 1880, and in Germany October 7, 1880.

*To all whom it may concern:*

Be it known that I, RASMUS JENSEN, of the town of Rosvang, near Thisted, in the Kingdom of Denmark, have invented an Improved Seed-Germinating Apparatus, of which the following is a full, clear, and exact description, reference being had to the accompanying drawing, forming part of this specification.

My invention relates to a seed-germinating apparatus; and it has for its object the providing of a substitute for the well-known hot-bench of a hot-house; and it consists in the combination, with a closed water-tank, through which heated water is circulated, of a disk or plate of a suitable porous material or substance, provided with a teat or tip-piece adapted to pass through an opening in the lid of the tank and depend into the water, together with a transparent cover adapted to be closed over the said disk or plate, all as hereinafter particularly described, and for the purpose set forth.

The drawing represents a vertical section of an apparatus embodying my invention.

A is a water-tank, which may be supported on suitable legs, as shown, and through which heated water is caused to circulate, which may be accomplished by means of the heater A' and its connecting-pipes a', as shown.

B is a disk or plate of any porous substance, such as wool, cotton, felt, or porous clay. Upon the under side of this disk is a teat or tip-piece of the porous material, as at b, and this teat is preferably integral with the mass of the disk. At a is an opening in the lid or top of the tank A, and the disk is placed on the said top, with its teat b depending through the opening a and dipping into the water, as shown, the teat being made long enough to accomplish this.

At C is shown a transparent cover, preferably in the form of a glass bell, which is adapted to inclose the disk, as shown.

The operation of my apparatus is as follows: A seed is placed upon the upper face of the disk B, and the bell C is then caused to cover the disk, as indicated. The moisture absorbed or drawn up by the teat b is imparted to the seed, and in conjunction with the heat radiated through the upper surface of the tank causes the seed, if it has life, to quickly germinate. After the seed has germinated or sprouted it may be removed and transferred to the earth in the usual way.

At B', I show a modification of my device which may be advantageously employed in germinating very small or delicate seeds. It consists in a tube of transparent glass, in the bottom end of which is a plug of cotton, wool, or equivalent material, on the top of which the seed is placed, and the lower end of which depends into the water, as shown. The upper end of the tube is closed by a wad of cotton or a cork.

It is evident that the number of disks and their covers may be multiplied in connection with one and the same water-tank.

The advantages of my apparatus are apparent. Seeds which are dead will be easily detected, while for those which germinate the apparatus constitutes a cleanly and inexpensive substitute for the ordinary hot-bench of a hot-house.

I am aware that apparatus has been heretofore employed in which heat from a lamp or other generator has been applied directly or through water as a medium to earth in which are plants, and also in which moisture has been generated and applied to plants through porous substances or otherwise to promote the propagation and growth of the plants, and hence I do not intend to claim herein an apparatus embodying these features, broadly; but I desire to limit my claim hereunder to the specific apparatus shown and described—that is to say:

What I claim as my invention, and desire to secure by Letters Patent, is—

In a seed-germinating apparatus, the combination, with the water-tank A, provided with suitable devices for heating water and circulating it therein, and having the opening a in the lid of the tank, of the disk plate or piece B, of a porous substance, having the tip-piece b, adapted to dip into the water in the tank, together with the transparent cover C, all constructed and arranged to operate as and for the purpose specified.

RASMUS JENSEN.

Witnesses:
F. H. JACOBSEN,
S. SCHULTZ.